Dec. 4, 1962 G. KOKOSH ETAL 3,066,783
COIN CONTROL DEVICE
Filed April 30, 1959 8 Sheets-Sheet 1

INVENTORS
GEORGE KOKOSH AND
EDWARD H. SAVELA

Caswell & Lagaard
ATTORNEYS

Dec. 4, 1962 G. KOKOSH ETAL 3,066,783
COIN CONTROL DEVICE
Filed April 30, 1959 8 Sheets-Sheet 2
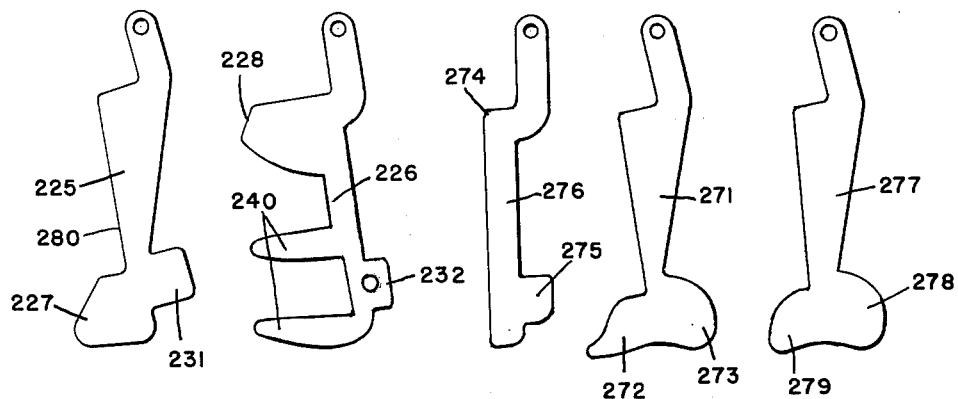
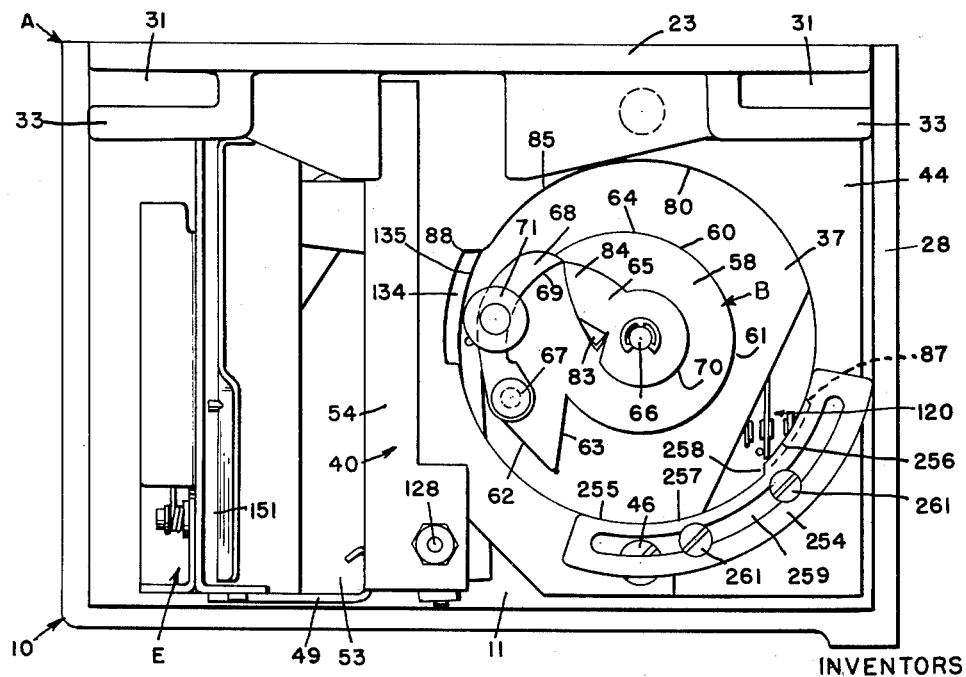
INVENTORS
GEORGE KOKOSH AND
EDWARD H. SAVELA
Caswell & Lagaard
ATTORNEYS Dec. 4, 1962 G. KOKOSH ETAL 3,066,783
COIN CONTROL DEVICE
Filed April 30, 1959 8 Sheets-Sheet 3

INVENTORS
GEORGE KOKOSH AND
EDWARD H. SAVELA
Caswell & Lagaard
ATTORNEYS

Dec. 4, 1962 G. KOKOSH ETAL 3,066,783
COIN CONTROL DEVICE
Filed April 30, 1959 8 Sheets-Sheet 4

INVENTORS
GEORGE KOKOSH AND
EDWARD H. SAVELA

Caswell & Lagaard
ATTORNEYS

Dec. 4, 1962 G. KOKOSH ETAL 3,066,783
COIN CONTROL DEVICE
Filed April 30, 1959 8 Sheets-Sheet 5

INVENTORS
GEORGE KOKOSH AND
EDWARD H. SAVELA

Caswell & Lagaard
ATTORNEYS

Dec. 4, 1962    G. KOKOSH ETAL    3,066,783
COIN CONTROL DEVICE
Filed April 30, 1959    8 Sheets-Sheet 6

INVENTORS
GEORGE KOKOSH AND
EDWARD H. SAVELA

*Caswell+Lagaard*
ATTORNEYS

Dec. 4, 1962 G. KOKOSH ETAL 3,066,783
COIN CONTROL DEVICE
Filed April 30, 1959 8 Sheets-Sheet 7

INVENTORS
GEORGE KOKOSH AND
EDWARD H. SAVELA

Caswell & Lagaard
ATTORNEYS

Dec. 4, 1962 G. KOKOSH ETAL 3,066,783
COIN CONTROL DEVICE
Filed April 30, 1959 8 Sheets-Sheet 8

INVENTORS
GEORGE KOKOSH AND
EDWARD H. SAVELA

Caswell & Lagaard
ATTORNEYS

United States Patent Office 3,066,783
Patented Dec. 4, 1962

3,066,783
COIN CONTROL DEVICE
George Kokosh and Edward H. Savela, Minneapolis, Minn., assignors to Coin-Meter Co., Minneapolis, Minn., a corporation of Minnesota
Filed Apr. 30, 1959, Ser. No. 810,019
12 Claims. (Cl. 194—72)

The herein disclosed invention relates to check or coin controlled devices and particularly to a device for connecting a freely rotatable manually operated finger piece to a revoluble member controlling the ultimate operation of the apparatus with which the device is to be used upon insertion of the proper coins or checks into the device.

An object of the invention resides in providing a device particularly adapted to control the operation of an electrically operated timing circuit.

Another object of the invention resides in providing a device operable upon the insertion of one or two coins in the same and inoperable upon the insertion of one coin if set for two coins, or upon insertion of a coin of improper denomination.

A still further object of the invention resides in providing a construction which will be foolproof in operation.

An object of the invention resides in providing a coin controlled device which will reject coins added after the apparatus has been initiated and a power failure occurs.

Another object of the invention resides in providing latching means affording a connection between the manually operated finger piece and the revoluble member, said latching means being rendered operable upon inserting the proper coins in the device and during such operation energizing the timing circuit and upon energization thereof or upon operable through a predetermined period being rendered inoperable.

A still further object of the invention resides in providing a ratchet for preventing reverse rotation of the revoluble member.

An object of the invention resides in providing a drive arm pivoted to a plate secured to said revoluble member and having a drive cam follower mounted thereon and engaging an internal drive cam fixed relative to said case, and in further providing a drive finger pivoted coaxially relative to said revoluble member and engaging said drive arm to effect a driving connection between said finger and revoluble member throughout a portion of the movement of said drive cam follower along said internal drive cam.

Another object of the invention resides in providing electric switch means including a switch arm actuated by a switch cam on said revoluble member and serving to energize the timing circuit and the service circuit.

A still further object of the invention resides in providing an electric motor for driving said revoluble member to reset said revoluble member and to terminate the timing period.

An object of the invention resides in providing coin receiving means for guiding various coins to juxtaposed substantially planiform positions and in providing a swinging shaft carrying a feeler arm with a feeler lever pivoted intermediate its ends to said feeler arm at the end thereof, said lever being simultaneously engageable with swinging feelers adapted to engage the coins to arrest movement of the shaft.

Another object of the invention resides in providing a latching arm attached to said shaft and having a latching cam thereon engageable with the drive cam follower on said drive arm and moving said feeler lever and feelers toward said coins.

A still further object of the invention resides in constructing said internal drive cam with a notched section permitting free movement of the drive cam follower to allow the drive finger to pass the drive arm when improper or insufficient coins are in the coin receiving means, and a circular section following the notched section and maintaining the drive arm in driving relation with the drive finger throughout a portion of the rotation of said revoluble member after the drive cam follower has left the latching cam and while the switch means is being closed, and a recessed section following the circular section and freeing the drive finger from the drive arm to permit the drive finger to freely rotate relative to the revoluble member during the timing period and while the revoluble member is under the control of the timing motor.

Other objects of the invention reside in the novel combination and arrangement of parts and in the details of construction hereinafter illustrated and/or described.

In the drawings:

FIG. 4 is a view similar to FIG. 3 with the cover removed and drawn to a greater scale.

FIGS. 21, 22, 23, 24 and 25 are elevational views of the feelers detached from the mechanism.

Figure 1:
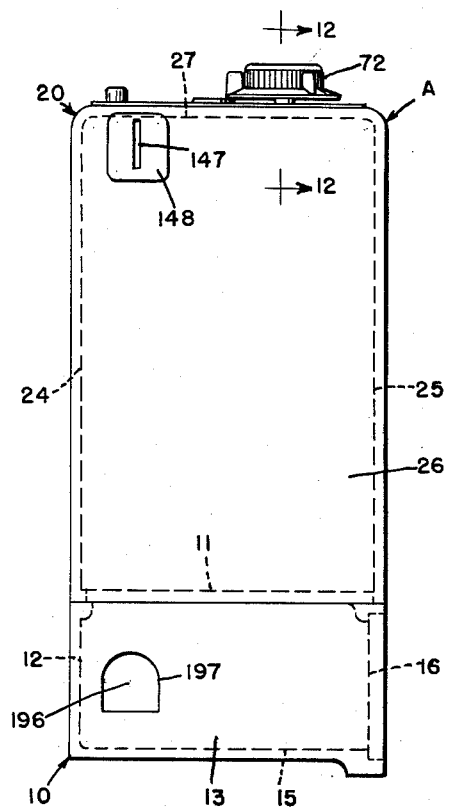
FIG. 1 is a front elevational view of a check controlled device illustrating an embodiment of the invention.
Figure 2:
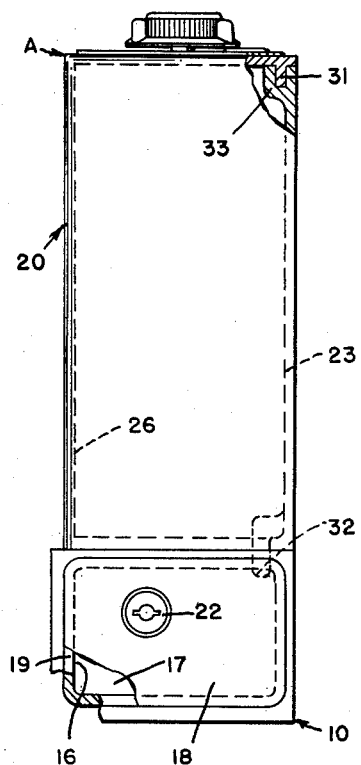
FIG. 2 is a right side elevational view of the structure shown in FIG. 1.
Figure 3:
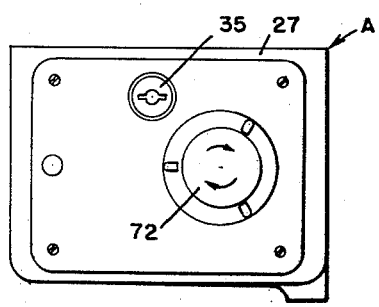
FIG. 3 is a plan view of the structure shown in FIGS. 1 and 2.
Figure 5:
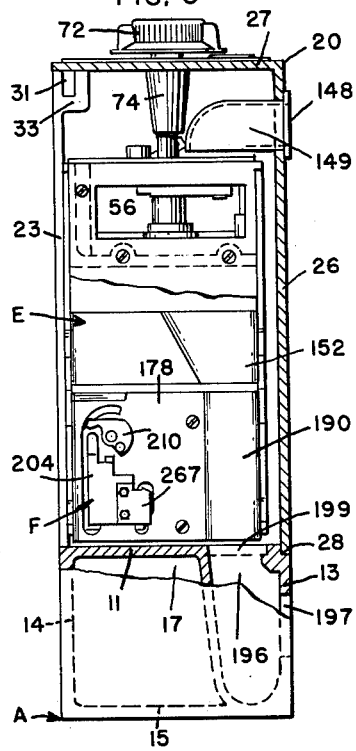
FIG. 5 is a left side elevational view of the structure shown in FIGS. 1 and 2 and with portions of the case broken away.

The invention is mounted in a case A shown in FIGS. 1 to 7 having a base 10 and a cover 20 attached thereto. The base 10 is hollow in form and is provided with a top 11, a side wall 12, a front wall 13, a rear wall 14 and a bottom 15, and is further provided with an access opening 16 in the portion of the same opposite the wall 12. By means of this construction, a money compartment 17 is formed within the base 10 accessible through the opening 16. This opening is normally closed by means of a door 18 received in a rabbet 19 encircling said opening and normally held in closing position by means of a lock 22. Extending upwardly from the top 11 and in coplanar relation with respect to the rear wall 14 is a back 23 which supports the mechanism of the invention and to which the cover 20 is attached.

The cover 20 consists of side walls 24 and 25, a front wall 26 and a top 27 being open at the rear and lower portions of the same. This cover overlies the base 10 and the walls 24, 25 and 26 rest in a rabbet 28 formed in the base 10. The cover 20 is held in position on the base 10 by means of lugs 31 which fit in sockets 33 on the back 23 and lugs 32 which fit into holes or sockets 34 in the top 11 of base 10, FIGS. 2 and 7. A lock 35 mounted on the top 27 holds the parts in assembled relation.

Figure 6:
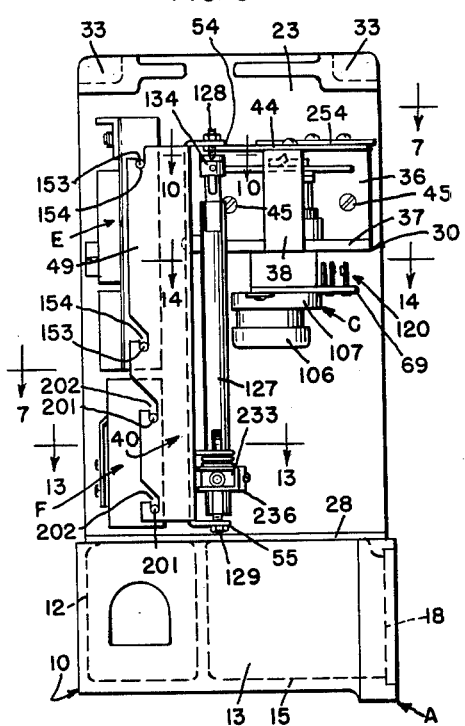
FIG. 6 is a view similar to FIG. 1 with the cover removed.
Figure 7:
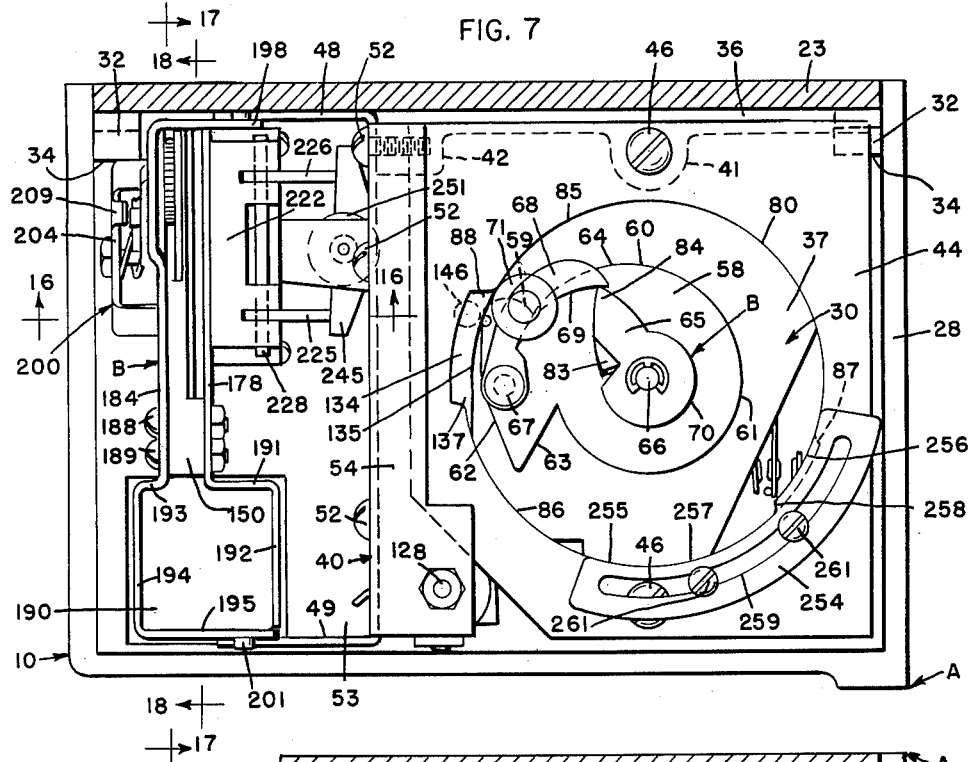
FIG. 7 is a plan sectional view taken on line 7—7 of FIG. 6 and drawn to a greater scale.
Figure 14:
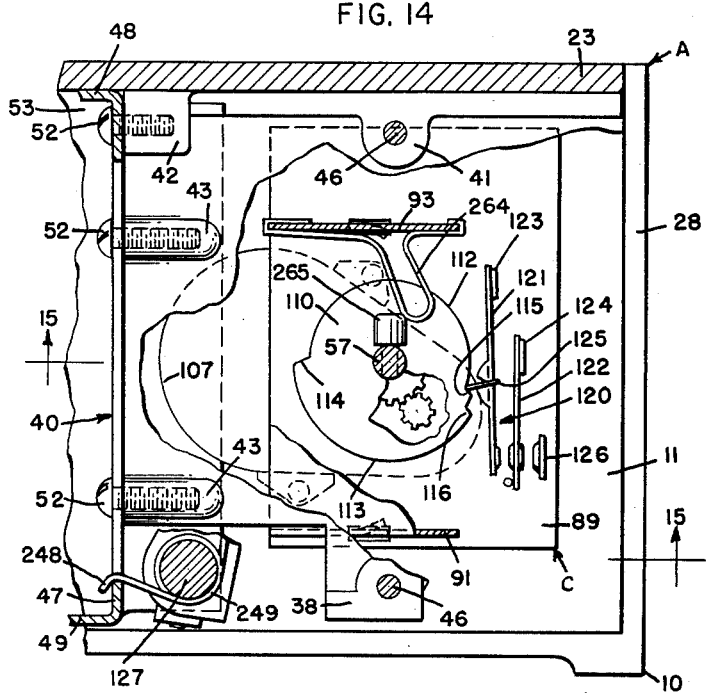
FIG. 14 is a plan sectional view taken on line 14—14 of FIG. 6 and drawn to a greater scale.

Within the case A is provided a supporting bracket 30, best shown in FIGS. 6 and 7, which has a flange 36 overlying the back 23 and secured thereto by means of screws 45. Said bracket also includes a shelf 37 extending outwardly from the lower end of said bracket and which has a post 38 extending upwardly from the forward edge of the same. In addition, pads 41, 42 and 43 are employed integral with the flange 36 and shelf 37 as shown in FIG. 14. A top plate 44 is attached to the post 38 and pad 41 by means of screws 46. Disposed to one side of the bracket 30 is a channel-shaped rack 40 which has a web 47 and flanges 48 and 49 extending outwardly from the web 47 at the sides thereof. This rack is attached to the bracket 30 by means of screws 52 which are screwed into the pads 42 and 43. The rack 40 is arranged with the flanges 48 and 49 and the space 53 between said flanges facing away from the bracket 30. In addition to the flanges 48 and 49 the rack 40 is formed with two additional flanges 54 and 55 which extend outwardly from the upper and lower edges of the web 47 and in opposite direction to the flanges 48 and 49.

Figure 8:
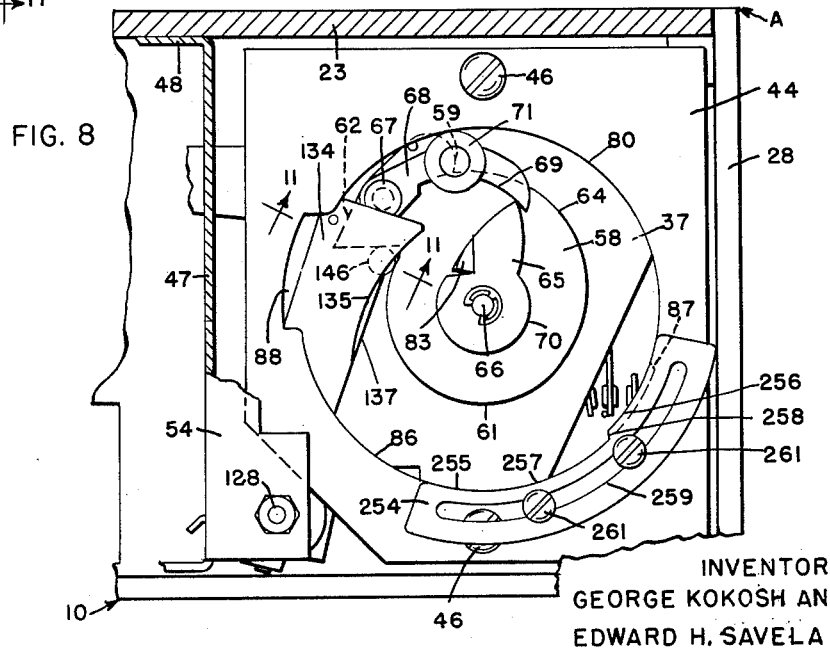
FIG. 8 is a view similar to FIG. 7 and showing the parts in altered positions.
Figure 9:
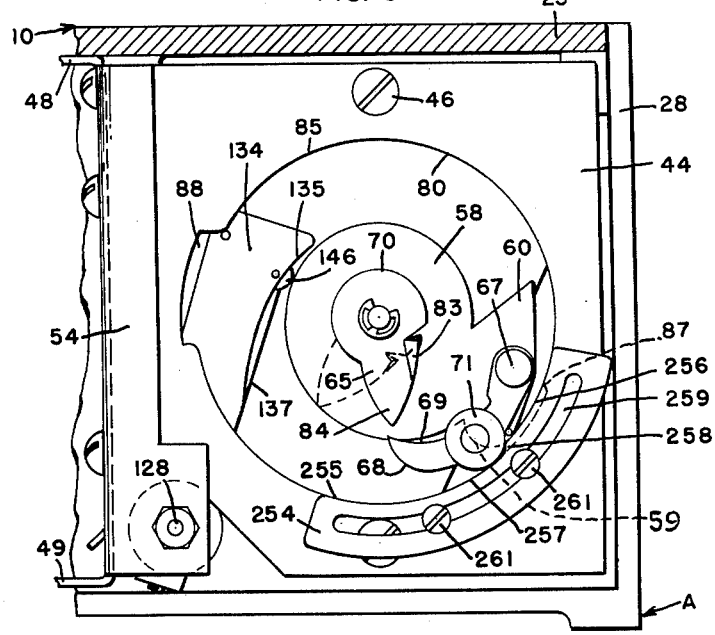
FIG. 9 is a view similar to FIG. 7 and showing the parts in still different positions.
Figure 10:
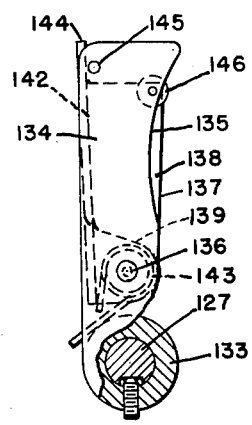
FIG. 10 is a cross sectional detail view taken on line 10—10 of FIG. 6 and drawn to the same scale as FIG. 9.
Figure 11:
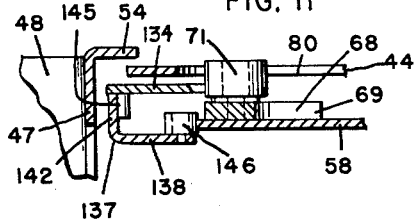
FIG. 11 is an elevational sectional detail view taken on line 11—11 of FIG. 8.

The actuating mechanism of the invention is indicated by the reference character B which is best shown in FIGS. 4 and 7 to 15, inclusive, and is constructed as follows: in the top plate 44 is formed an internal cam 80 which has been referred to as a maintaining cam of the invention. This cam has a circular section 85 which merges into a larger circular section 86 by means of a spiral section 87. This cam is formed with a notch 88 which connects the circular portions 85 and 86. The spiral section 87 may be adjusted circumferentially to vary the position of the same by means of an adjusting cam 254. This cam is arcuate in form and is provided with a cam surface 255 having a section 256 corresponding with the section 85 of cam 80, with a section 257 corresponding with the section 86 of cam 80 and with a section 258 corresponding with the section 87 of cam 80. This cam is mounted on the plate 44 with the sections 256 and 257 registering with the sections 85 and 86 of cam 80. The cam 254 has an arcuate slot 259 in the same concentric with the axis of the cam sections 85, 86, 255 and 256. Two clamping screws 261 extend through this slot and are screwed into the plate 44. This construction permits of varying the position of the cam section 87, as the cam section 258 takes over when the cam 254 is moved in a clockwise direction as shown in FIG. 9 from the locality of registration of the cam sections 87 and 258.

Issuing upwardly from the shelf 37 is a vertical bearing 56 (FIG. 15) in which is rotatably mounted a revoluble member or shaft 57. Near the upper end of this shaft is attached to it a plate 58 having its edge formed to provide a latching cam 60. This cam has an inwardly disposed circular section 61, an outwardly disposed section 62 of greater diameter than section 61, a radial section 63 and a spiraling section 64. Between the sections 62 and 64 is a curved radial section 59. A drive finger 65 is rotatably mounted on a reduced portion 66 of revoluble member 57 and overlies the plate 58. This finger has a tip 84 and a circular portion 70. Mounted for rotation on a pin 67 attached to plate 58 is a drive arm 68 having a cam 69 engageable by the drive finger 65. This arm has pivoted to it a roller 71 serving as the drive cam follower and which rides along the surface of the drive cam 80. The drive arm 68 and associated structure serves as the control means for controlling the movement of the movable operating means including revoluble member 57.

Figure 12:
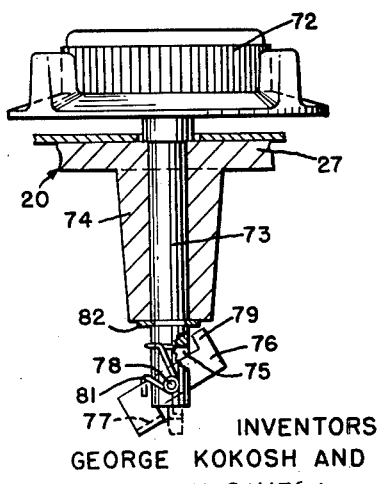
FIG. 12 is a fragmentary elevational sectional view taken on line 12—12 of FIG. 1 and drawn to a greater scale.

The shaft 57 is rotated by means of a finger piece or knob 72, best shown in FIG. 12, which is attached to a shaft 73. Shaft 73 is journaled in a bearing 74 disposed on the underside of the top 27 of cover 20. The lowermost portion of said shaft is formed with a slot 75 therein and in which is received a lever 76 with a dog 77 at one end of the same. The lever is pivoted to said shaft by means of a pintle 78 which extends through said shaft and lever. The other end of said lever is provided with a stop 79 which engages the shaft and limits downward movement of said dog. A torsion spring 81 encircles the pin 78 and engages the lever 76 and shaft 73 and serves to urge the dog in the position shown in FIG. 12. A lock collar 82 mounted on shaft 73 retains said shaft in proper relation within the bearing 74. When the cover 20 is applied, the shaft 73 is disposed in alignment with the shaft 57 and the dog 77 is adapted to engage a lug 83 formed on the drive finger 65. As the knob 72 is rotated in a clockwise direction, finger 65 is correspondingly rotated, and the tip 84 of said finger is caused to engage the cam surface 69 of drive arm 68. This drive arm and finger form the latching means between knob 72 and revoluble member 57. While the roller 71 is opposite the notch 88 and when no coins have been placed in the machine, the drive arm 68 is forced by the tip 84 of said finger towards said notch and the finger 65 passes freely by the same and without rotating shaft 57.

Figure 15:
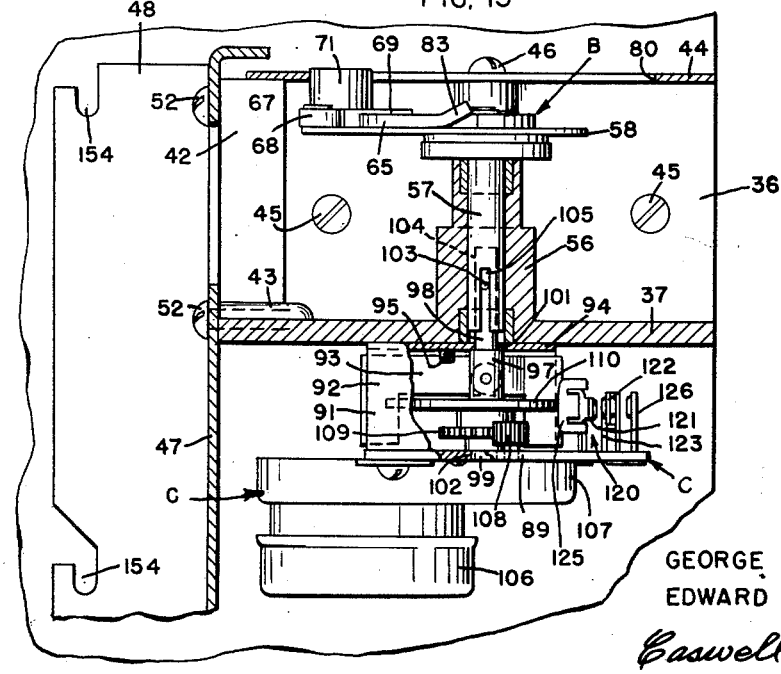
FIG. 15 is an elevational sectional view taken on line 15—15 of FIG. 14.

Below the shelf 37 and attached to it is a timing unit C which is a purchased item now available on the market. This timing unit, as shown in FIGS. 6, 14 and 15, comprises an insulating plate 89 on which is supported a metal U-shaped frame 91. This frame has spaced legs 92 and 93 which extend through and are attached to the plate 89. The said frame further has a connecting portion 94 between said legs and which is attached to the underside of the shelf 37 by means of screws 95 which pass through said shelf and are screwed into said connecting portion to support the entire structure with reference thereto. Mounted between the connecting portion 94 and the plate 89 is a shaft 97 which has reduced portions 98 and 99 at its ends. These portions extend through holes 101 and 102 in the connecting portion 94 and the plate 89 which serve as bearings for the shaft 97. The reduced end 98 of shaft 97 has a drive pin 103 extending transversely thereof. The reduced end 98 is adapted to enter the bearing 56 and to be received in a bore 104 formed in the lower end of the revoluble member 57. The lower portion of this revoluble member is formed with a slot 105 which receives the pin 103. By means of this construction, the revoluble member 57 and shaft 97 are splined together for concentric rotation. Secured to the shaft 97 is a lug 265 which engages with a spring 264 attached to leg 93 of frame 91. This spring prevents rapidly spinning shaft 97 in a manner to prevent operation without the insertion of the proper coins.

Disposed on the underside of the plate 89 is an electric motor 106 which drives a speed reducing gear train disposed within a case 107. Such construction being well known in the art has not been shown in the drawings. This gear train includes a spur pinion 108 which meshes with a spur gear 109 fast on the shaft 97. Also secured to said shaft is a switch cam 110 which has two circular sections 112 and 113. The section 112 is smaller in diameter than the section 113 and the two sections are connected together by means of a short spiral section 114 and two stepped sections 115 and 116. This cam serves as movable operating means for controlling an ultimate operation. Disposed adjacent the cam 110 is a switch 120. This switch includes two switch arms 121 and 122 which are mounted on posts 123 and 124 secured to the plate 89. The switch arm 121 has a cam follower 125 secured to it and which, when engaging the section 112 of cam 110, opens switch 120. When the said cam rotates to bring the spiral portion 114 into engagement with cam follower 125 and the cam follower reaches the portion 113, the switch closes and is maintained closed until the switch reaches the stepped sections 115 and 116. Said switch also includes a post 126 which may be used as part of another switch in which the switch arm 122 forms a part. Or, if desired, when only one switch is required, the post 126 serves merely as a stop.

Extending in a vertical direction between the flanges 54 and 55 of the rack 40 is a shaft 127 which is supported for rotation on two pivots 128 and 129 screwed into said flanges as illustrated in FIG. 6. The upper end of this shaft is reduced in diameter and has secured to it a boss 133 (FIG. 10) which has issuing outwardly from it a latching arm 134. This arm is formed with a latching cam 135 and which is adapted to engage the drive cam follower 71. Cam 135 has the same curvature as section 85 of cam 80 and at one position of latching arm 134 is adapted to lie in continuation thereof and to overlap it somewhat. The arm 134 has secured to it a depending headed stud 136 and on which is mounted for swinging movement a coin release arm 137. This arm is stamped from sheet metal and has two parallel legs 138 and 139 with a connecting portion 142 therebetween. The stud 136 passes through these legs and journals the said arm for swinging movement. Encircling the stud 136 between the legs 138 and 139 is a helical spring 143 which engages the connecting portion 142 and the boss 133 and urges the coin release arm 137 to move in a clockwise direction as viewed in FIG. 10. The extreme end 144 of the connecting portion 142 is adapted to engage a stop 145 on the arm 134 and limits the movement of said arm 137 caused by spring 143. At the outermost corner of the leg 138 of arm 137 is provided a roller 146 which serves as the coin release cam follower. Mounted on shaft 57 is the coin release cam 60 which is engageable with the roller 146.

The coins to be used with the device are inserted into a coin classifier and slug rejecter E which is mounted in the uppermost portion of the rack 40 and shown in FIGS. 4 and 6. This item is a purchased item and contains mechanism for separating the various denominations of coins and delivering them to two passageways disposed side by side for a purpose to be presently described in detail. The said mechanism being now well known in the art, has not been shown in detail, and it can be readily comprehended that any suitable device now available for the purpose may be used without affecting the operation of the invention. Coins are fed into a coin slot 147 disposed in an escutcheon 148 mounted on the front wall 26 of cover 20. Attached to this escutcheon is a coin chute 149, FIG. 5, which delivers the coin to the top of the coin classifier and slug rejecter E and discharges them into a slot 151 therein. This device deposits the slugs in a hopper 152 provided thereon and which discharges the same from the mechanism as will be presently described. The coin classifier and slug rejecter E has pins 153 issuing laterally therefrom and which are adapted to be received in bayonet slots 154 formed in the flanges 48 and 49 of the rack 40 and are supported thereby.

Below the coin classifier and slug rejecter E is mounted a coin control mechanism F which is best shown in FIGS. 16, 17, 18 and 19. This mechanism includes coin receiving means 140 which utilizes a die cast core 150. This core is formed on the side nearest the web 47 with raised portions 155, 156 and 157 to form an entrance passageway 158 for nickels and quarters, a surplus coin discharge passageway 159 and a coin retaining passageway 161. The said core is further formed with longitudinally extending slots 162 and 163 and openings 164, 165, 166, 167, 168, 169 and 171. The coin classifier and slug rejector E delivers only nickels or quarters to the passageway 158. Passageway 161 communicates with a slot 131 in top 11 of base 10 which communicates with coin compartment 17 in base 10.

On the other side of the core 150 are formed raised portions 172, 173 and 174 which form an entrance passageway 175 for dimes, a dime retaining passageway 220, a surplus coin discharge passageway 176 and a second coin retaining passageway 177. The coin classifier and rejecter E delivers only dimes to the passageway 175. The passageway 220 communicates with a slot 132 in the top 11 of base 10 which in turn communicates with the coin compartment 17 in said base. The second coin retaining passageway 177 communicates with the slot 131.

Figure 20:
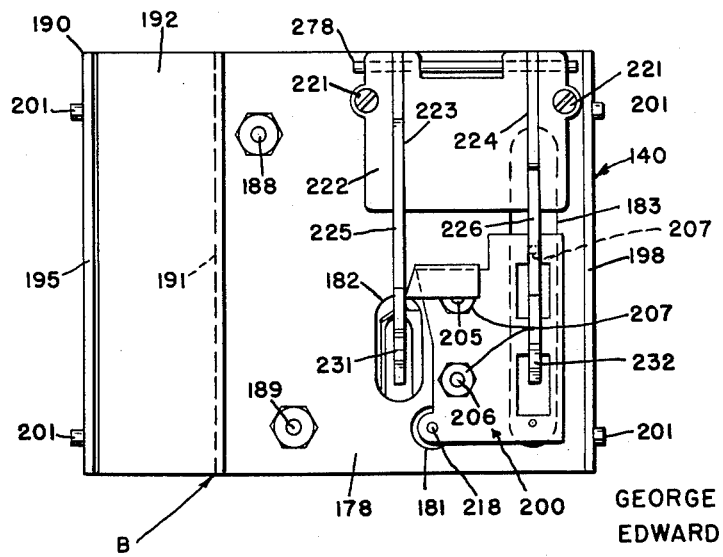
FIG. 20 is a view similar to FIG. 19 of the coin control mechanism viewed from the inner side thereof.

Overlying the core 150 on the side thereof facing the web 47, FIG. 20, is a plate 178 which has holes in it corresponding to the holes 164, 165, 167 and 168, which have not been shown in the drawings. This plate in addition has a hole 181 in it which registers with the hole 166. The said plate has slots 182 and 183 in it which register with the slots 162 and 163. On the other side of the core 150 is a plate 184 similar to the plate 178. This plate is formed with holes corresponding with and registering with the holes 164, 165, 166, 167 and 168 similar to the plate 178. In addition, the same has a hole 185 corresponding with the hole 166. Said plate further has slots 186 and 187 which correspond with the slots 162 and 163. The two plates 178 and 184 are bolted to the core 150 by means of bolts 188 and 189 which extend through the holes 164 and 165 in the core 150 and the corresponding holes in the plates 178 and 184. The plates 184 and 178 close the passageways 158, 159, 161, 175, 176 and 177 to guide the coins therethrough.

The plate 178 has formed on it a flange 191 (FIG. 7) which has issuing from it an offset 192 spaced from the plane of the said plate proper. Plate 184 is similarly constructed with a flange 193 which has issuing from it an offset 194 parallel to the said plate proper. This offset in turn has issuing from it another flange 195 which extends up to the offset 192. By means of this construction, a duct 190 is formed which communicates with the lower end of the forward portion of the coin classifier and slug rejector E and with the hopper 152 forming a part thereof. All of the slugs and spurious coins rejected by the rejector E pass through the hopper 152 and into the duct 190 and are discharged through an opening 199 in the top 11 of base 10 and into a pocket 196 (FIG. 5) in the base 10. Access to this pocket is had through a finger hole 197 in the wall 13 of base 10. These coins and slugs are thus returned to the user of the device.

The plate 184, in addition to the flanges referred to, is formed with a flange 198 issuing from the same in the same direction as the flange 191 of plate 178. The flanges 195 and 198 are received within the flanges 48 and 49 of the rack 40. The flanges 198 and 195 have attached to them lugs 201 which are adapted to enter into bayonet slots 202 formed in the flanges 48 and 49. By means of this construction, the coin control mechanism F is detachably mounted on the rack 40 and may be removed for replacement with another mechanism or for repair when required.

The coin control mechanism F further includes a coin retaining device 200. This device consists of two plates 203 and 204, best illustrated in FIGS. 16, 19 and 20, and which are disposed outwardly of the two plates 178 and 184 and which have attached thereto shouldered screws 205 and 206. These screws have nuts 207 screwed on the threaded ends thereof and which clamp the two plates in spaced parallel relationship. The screws 205 pass through the holes 167 and 168 in the core 150 as well as the corresponding holes in the plates 178 and 184 and support the two plates constituting the coin retaining device 200 for sliding movement from positions shown in dotted lines to full lines in FIG. 13 and vice versa. Springs 208 encircling the screws 205 and 206 and disposed between the plate 184 and the plate 204 urge the plate 204 outwardly as shown in FIG. 16.

Pivoted to a stud 230 attached to the plate 184 is a coin shifter 210 (FIG. 19) which has a finger 211 extending through a curved slot 212 in the plate 184. This finger extends through the passageway 175 and into a curved groove 219 in core 150 registering with slot 212. The coin shifter 210 has a second finger 213 which extends through a slot 214 in plate 184 and into a corresponding depression 215 in the core 150. Coin shifter 210 further has a lug 216 which is mounted on the lower portion of the same and which causes the said shifter to swing to the position shown in FIG. 19. The finger 213 is disposed in the slot 187 of the plate 184 and in the slot 162 of the core 150. Finger 211 engages the portion of the plate 184 at the end of slot 212 and serves as a stop for holding the finger 213 in proper position within the slot 187. A projection 209 on plate 204 engages the lug 216 on shifter 210 and prevents movement of the coin retaining device 200 when there is no coin in passageway 175.

Figure 16:
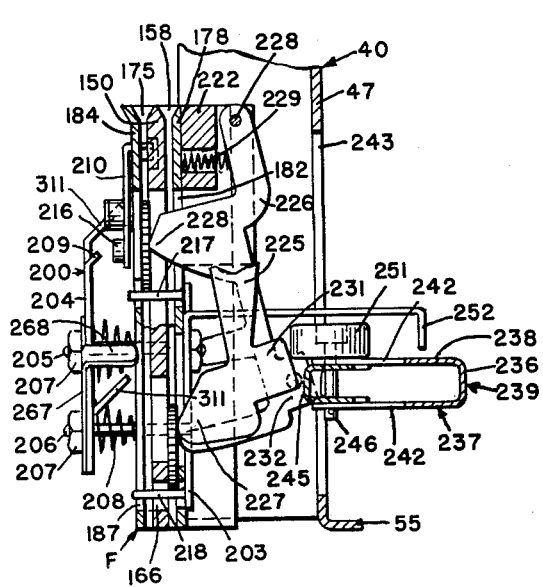
FIG. 16 is an elevational sectional view taken on line 16—16 of FIG. 7.

Attached to the plate 203 are two pins 217 and 218 illustrated in FIG. 16. The pin 217 normally extends through the slot 183 in plate 178, the slot 162 in core 150, the passageway 220 and the slot 187 in plate 184. The pin 218 passes through the hole 181 in plate 178, the passageway 161, the hole 166 in core 150, the passageway 177 and the hole 185 in plate 184. The pin 217 is adapted to pass out of the passageway 220 which extends along the slot 162 and the pin 218 is adapted to pass out of the passageway 177 and the passageway 161 when the coin retaining device 200 is moved toward the right as viewed in FIG. 16.

As shown in FIG. 20, a mounting block 222 is attached to the plate 178 by means of screws 221. This mounting block is formed with two vertical slots 223 and 224 and in which are mounted feeler levers 225 and 226 which have feelers 227 and 228 formed thereon. See FIGS. 21 and 22. The feeler 227 is adapted to extend through the slot 182 and to enter the slot 163 and engage a coin resting in the passageway 161 on pin 218. The feeler 228 similarly is movable through slot 183 in plate 178 and into a slot 162 to engage a coin disposed in passageway 220 and resting on pin 217. The levers 225 and 226 are pivoted on a pintle 278 extending through the upper portion of the block 222. A spring 229, FIG. 16, disposed in the slot 223 holds the lever 225 outwardly of the slot 163. The lever 226 is provided with counterweights 240 which normally hold the same out of slot 162. The levers 225 and 226 have lugs 231 and 232 extending outwardly therefrom and by means of which the same may be urged against the coins contained within the coin mechanism as will be presently described.

The shaft 127 has mounted on it an adjusting arm 233 (FIG. 13) which has a boss 234 formed on it and through which said shaft extends. A set screw 235 is screwed into this boss and engages the said shaft to hold the adjusting arm 233 fixed relative to the shaft. In conjunction with the arm 233, a sensing arm 236 is employed, which is constructed from sheet metal and which is U-shaped in form having two overlying portions 237 and 238 and a connecting portion 239 therebetween. The portions 237 and 238 are drilled at their outer ends to receive the shaft 127 and straddle the boss 234 and the arm proper 233. A screw 241 extends through the connecting portion 239 of arm 236 and is screwed into the arm 233 proper. By means of this construction the two arms may be angularly adjusted relative to one another. The two overlying portions 237 and 238 have lateral extensions 242 which are adapted to extend through an opening 243, FIG. 16, in the web 47 of rack 40. These extensions have disposed between them a U-shaped sensing lever 245 which is pivoted intermediate its ends on a pintle 246 extending through the extensions 242 and said sensing lever. The sensing lever is adapted to engage the lugs 231 and 232 on the feeler levers 225 and 226 and to urge the feelers 227 and 228 against the coins in the passageways 177 and 161. A torsion spring 247 is coiled about the shaft 127 and has one end 248 hooked about the portion of the web 47 at the opening 243 and which has the other end 249 hooked about the overlying portion 238 of arm 236. The sensing arm 236 serves as a guide means for guiding the pintle 246 for lever 247 toward and from the coin receiving means.

The pivot 246 has rotatably mounted on it a coin release member or roller 251. This roller is adapted to engage a depending lip 252 formed on a coin release bracket 253 extending outwardly from the plate 203.

Figure 13:
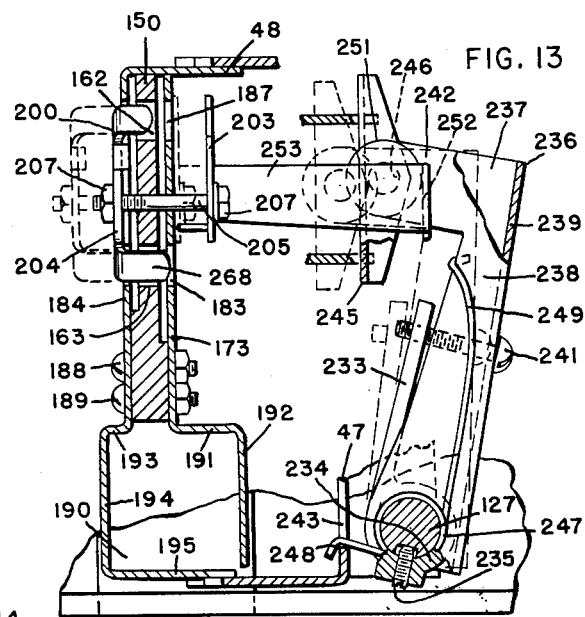
FIG. 13 is a fragmentary cross sectional view taken on line 13—13 of FIG. 6 and drawn to a greater scale.

Detachably mounted on plate 204 by means of the screws 205 and 206 is an extension 267 which overlies the slot 186. This extension has issuing inwardly from it a deflector 268 which normally is disposed outwardly of passageway 161 but when the coin retaining device is positioned as shown in FIG. 13 enters both the passageways 161 and 177.

While the term coin has been used throughout the specification it can readily be comprehended that the device will also operate with checks or similar members serving the same purpose and that whenever the word coin is used the term should be interpreted broadly enough to include such other check or device.

Figure 17:
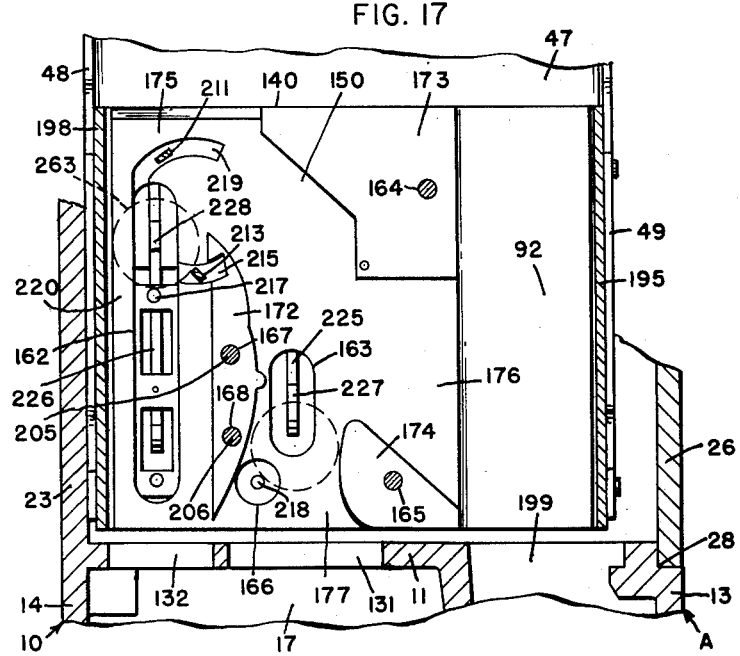
FIG. 17 is an elevational sectional view taken on line 17—17 of FIG. 7.
Figure 18:
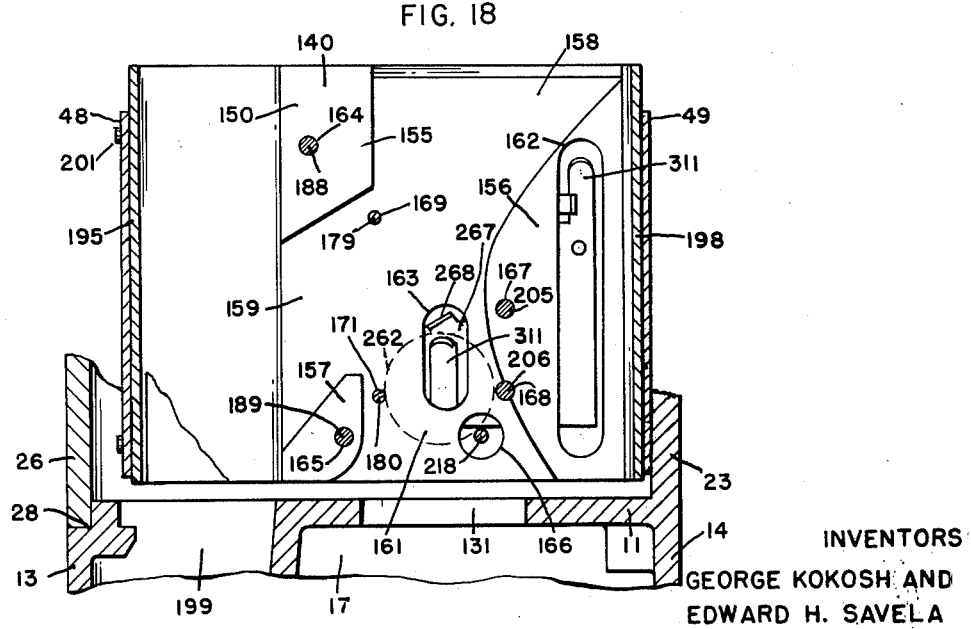
FIG. 18 is an elevational sectional view taken on line 18—18 of FIG. 7.

The operation of the invention is as follows: When the device is in disuse the parts are arranged as shown in FIG. 4 and in dotted lines in FIG. 13. Drive cam follower 71 in such position is opposite notch 88 in cam plate 44 and may travel into the same. As the knob 72 is rotated in a clockwise direction, dog 77 is brought into engagement with lug 83 on drive finger 65 and said finger correspondingly rotated in a clockwise direction. As the tip 84 of said finger engages the cam surface 69 of drive arm 68, the said arm is swung in a counterclockwise direction as viewed in FIG. 4. This causes sensing arm 236 to move in a counterclockwise direction and sensing lever 245 engages the feeler levers 225 and 226. If no coins or only one coin has been inserted, lever 245 is free to move toward plate 178 and latch arm 134 is free to swing in a counterclockwise direction. Cam follower 71 then recedes into notch 88 and the tip 84 of finger 65 passes out of engagement with cam surface 69 and is free from arm 68. Nothing happens. Should the knob 72 be turned in the wrong direction the dog 77 will slip by the lug 83 and again nothing will happen. Assume that the pins 179 and 180 are mounted in the holes 169 and 171 of core 150 of the coin control mechanism F. The device is then set to accept one dime and one nickel. If now one nickel were inserted in slot 147, coin classifier and rejecter E would discharge the same into passageway 158, FIG. 18, and the coin would come to rest on the pins 180 and 218 as shown in dotted lines at 262. In such position a portion of the coin would overlie the slot 163 and lie opposite the feeler 227 on feeler arm 225. If the knob 72 were now rotated the sensing arm 236 would again move sensing lever 245 toward the coin control mechanism F. Feelers 227 and 228 would again be moved toward passageways 158 and 175. Feeler lever 225 would be arrested in movement due to the fact that feeler 227 engaged coin 262 but feeler 228 would continue to move into and through passageway 175 since lever 245 is free to swing on pintle 246. Again nothing would happen. If instead of the nickel a dime were inserted in slot 147 the coin classifier and slug rejector E would direct the same into passageway 175 and the dime would engage the finger 213 on coin shifter 210 and move the same from the position shown in FIG. 19 to that shown in FIG. 17 and come to rest on the pin 217. In FIG. 17 a dime so positioned is shown in dotted lines and indicated by the reference numeral 263. Again, if knob 72 were rotated, sensing lever 245 would be moved toward the coin control mechanism E but feeler lever 226 would be arrested due to engagement with the dime. However, movement of sensing arm 236 would continue since feeler 227 could move into and through passageway 161. Again nothing would happen. If, however, both the dime and the nickel are inserted in slot 147 then latch arm 134 is arrested when the latching cam 135 lies in continuation with the section 85 of cam 80. Drive cam follower 71 now rolls from cam 135 to cam 80 and leaves arm 134. It will be noted that the tip 84 of finger 65 is maintained in engagement with drive arm 68 when follower 71 is in engagement with cam 80, thus causing rotation of the revoluble member 57. Since coin release cam 60 is attached to this member it travels with it. Coin release cam follower 146 travels along the surface of cam 60. Due to spring 247 this cam follower is urged against cam 60 and the drive follower 71 urged against cam 80 by finger 65. In the inoperative position of the device, cam follower 146 rests in back of the section 59 of cam 60 and initially locks revoluble member 57 from rotation. When, however, finger 65 forces drive arm 68 outwardly, cam follower 71 moves latching arm 134 outwardly and along with it cam follower 146 which is then in a position to engage section 62 of cam 60. If no coins or only one coin is inserted, cam follower 146 again drops back of cam section 64. If, however, the proper coins are inserted, cam follower 146 rides section 62 of cam 60 permitting cam 60 to rotate. At such time cam 135 lies in continuation of cam 80 and tip 84 of finger 65 is held in engagement with drive arm 68 effecting a positive drive for revoluble member 57.

Shortly before revoluble member 57 reaches the position shown in FIG. 8 latching cam 135 is free from drive cam follower 71. Latching arm 134 is now free to move inwardly toward revoluble member 57 and is only obstructed from so moving by means of cam follower 146 riding on the section 62 of cam 60. Coin release cam follower 146, when reaching such position, moves radially inwardly along the radial section 63 of cam 60 and carries latching arm 134 with it. Since roller 251 is mounted on said arm it engages the lip 252 on bracket 253 and shifts coin retaining device 200 in a direction toward revoluble member 57 to withdraw the fingers 217 and 218 from engagement with the coins. The coins now drop from the passageways 220 and 177 and through slots 131 and 132 in top 11 into the money compartment 17 in the base 10. To assist in freeing the coins when the operation is completed, fingers 311 are employed, which are formed on the plate 204 and which enter the passageways 220 and 161 and engage the coins therein when the pins 217 and 218 are withdrawn. Cam follower 146 now rides on the circular section 61 of cam 60. At the same time deflector 268 enters passageways 161 and 177. In such position, coins deposited in passageways 161 and 177 are deflected into passageways 159 and 176 and discharged into duct 190 and returned to the user. The parts so remain until the timing period is completed. Should the power go off during the timing period coins inserted by the user would be returned.

When revoluble member 57 reaches the position shown in FIG. 9, switch cam follower 125 has climbed cam section 114 of cam 110 and is riding on the outermost circular section 113 of said cam. Switch 120 is now closed. This switch controls both the motor 106 and the circuit by means of which the ultimate operation is procured. At the same time or shortly thereafter, drive cam follower 71 follows cam section 258 of cam 254 and rides along section 257 of cam 254 and section 86 of cam 80. While moving along these sections of the cam, finger 65 is free to pass drive arm 68 and revoluble member 57 is free from manual control. Energization of the motor 106 causes the time period to commence as soon as drive cam follower 71 passes section 258 of cam 254. Coin release cam follower 146 now commences the gradual climb up the spiral section 64 of coin release cam 60 until it reaches the position shown in FIG. 4 when the switch cam follower 125 has dropped off the outer cam section 113 of switch cam 110 and opened switch 120. At this position cam follower 146 lies in back of cam section 59 of cam 60 and the device is reset for another operation.

Figure 19:
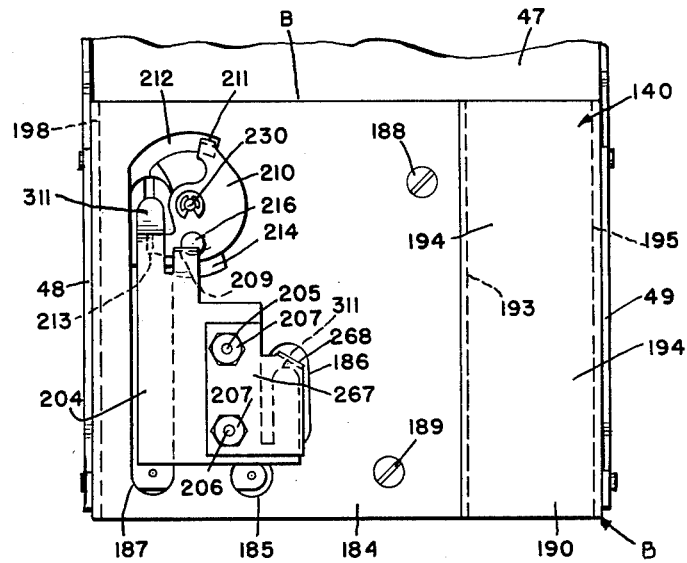
FIG. 19 is an elevational view of the coin control mechanism viewed from the outer side thereof.

The coin controlled mechanism may be used with two dimes, a nickel and a dime or a quarter and a dime. When used with one dime and a nickel, an extension 267 such as shown in FIG. 19 is employed which is attached to plate 204 by two of the nuts 207. This extension has a deflector 268 on it which extends into a slot 186, passageway 161 and slot 163. This deflector discharges surplus dimes into passageway 176 from which they are deposited in pocket 196. The nickels are deposited in passageway 158 and strike pin 179 and are directed downwardly and come to rest in passageway 161 on pins 180 and 218. If a second nickel is inserted in the device it engages the first nickel and is directed into channel 159 where it enters duct 190 and is discharged into pocket 196. When a dime and a quarter are to be used deflector 268 is again employed but the pins 169 and 171 are removed. This widens the passageways 158, 169 and 161 to pass quarters through the same.

When the device is to be used with two dimes, the deflector 268 is omitted and a feeler lever 271 such as shown in FIG. 24 is employed instead of lever 225. This lever has a feeler 272 which is somewhat longer than the feeler 227 to reach into coin passageway 177 and a lug 273. The first dime inserted falls into pasageway 175, engages finger 231 on coin shifter 210 rotating the same, and coming to rest on pin 217. At the same time finger 211 is moved to the position shown in FIG. 17. A second dime deposited in coin chute 149 falls into the same passageway, strikes finger 211 and is directed into passageway 177, deflector 268 being absent and not directing it to passageway 176. The second dime then comes to rest in the position shown in dotted lines in FIG. 17 on the pins 171 and 218. In place of the feeler lever 226 a feeler lever such as indicated by the reference numeral 274 in FIG. 23 is employed. Ths lever has a lug 275 but no feeler. Instead, it is formed with a straight bar 276 which engages the plate 178 and arrests movement of the sensing lever 245. After the first dime has been inserted control is transferred to the second dime. By proper adjustment of screw 241 the device can be made to operate with only one lever having a feeler. Operation then is as previously described.

If desired, the device can be made to operate with single coins as well as two coins. For a nickel or a quarter the lever 274 is employed and in addition a lever 277 similar to the lever 225. This lever is shown in FIG. 25 and has a lug 278 and a feeler 279, a trifle shorter than the feeler 227. The operation is the same as where a nickel or a quarter is used with a dime excepting that a different adjustment of the screw 241 has to be made. Where only a single dime is to be used levers 225 and 226 are employed. In such case, the flat surface 280 on lever 225 is utilized which engages plate 178 similar to the bar 276 of lever 274. Proper adjustment of screw 241 becomes necessary to bring the parts in operative relationship.

The advantages of the invention are manifest. The mechanism may be used with two coins either nickels, quarters or dimes to procure operation for fifteen cents, twenty cents, twenty-five cents and thirty-five cents. The device returns all spurious coins, slugs and washers and also returns all surplus coins or coins of the wrong combination. The device is foolproof in operation and can be used for various purposes.

Changes in the specific form of the invention, as herein described, may be made within the scope of what is claimed without departing from the spirit of the invention.

Having described the invention, what is claimed as new and desired to be protected by Letters Patent is:

1. In a coin controlled mechanism for use with a plurality of coins, movable operating means controlling an ultimate operation, coin receiving means receiving and transferring coins to two spaced working positions therein, feelers guided for movement toward said positions and beyond the same, a sensing lever, pivot means for said sensing lever disposed intermediate its ends, each end of said lever being associated with and moving one of said feelers toward its working position, a shaft, a sensing arm mounted on said shaft and supporting and guiding said sensing lever for movement toward and from said coin receiving means and said feelers toward, from, and beyond their corresponding working position, said feelers upon being simultaneously restrained from movement beyond their working positions holding said pivot means and sensing arm in an operative position, a freely rotating manually operated finger piece, said operating means including a revoluble member and latching means between said finger piece and revoluble member connecting said finger piece to said revoluble member when said sensing arm is held in its operating position.

2. In a coin controlled mechanism for use with a plurality of coins, coin receiving means receiving and transferring coins to two spaced working positions therein, feelers guided for movement toward said positions, a sensing lever, pivot means for said sensing lever disposed intermediate the ends of the same, each end of said sensing lever being associated with and moving one of said feelers toward its working position, a shaft, a sensing arm mounted on said shaft and supporting and guiding said sensing lever for movement toward and from said coin receiving means, and said sensing lever abutting said feelers and exerting an actuating force thereon tending to move said feelers toward and beyond said their working positions, a freely movable manually operated finger piece, operating means controlling an ultimate operation, said feelers upon being simultaneously restrained from movement beyond their working positions holding said shaft from movement, to effect a driving connection between said manually operated finger piece and said movable operating means.

3. In a coin controlled mechanism for use with a plurality of coins, coin receiving means receiving and transferring coins to two spaced working positions therein, hanging feeler levers, pivot means at the upper ends of said levers guiding said levers for swinging movement toward and from said positions, feelers on said levers disposed at said positions, a sensing lever, pivot means for said sensing lever disposed intermediate the ends of the same, each end of said sensing lever being associated with and moving one of said feelers toward its working position, a shaft, a sensing arm mounted on said shaft and supporting and guiding said sensing lever for movement toward and from said coin receiving means, and said sensing lever abutting said feelers and exerting an actuating force thereon tending to move said feelers toward and beyond their said working positions, a manually operated finger piece, operating means controlling an ultimate operation, said feelers upon being simultaneously restrained from movement beyond their working positions holding said shaft from movement, to effect a driving connection between said manually operated finger piece and said movable operating means.

4. In a coin controlled mechanism, a normally freely rotatable finger piece, operating means controlling an ultimate operation and including a revoluble member coaxial with said finger piece, a drive finger rotatable with said finger piece, a drive arm pivoted to a part movable with said revoluble member and having a drive cam engageable by said finger, a latching arm, pivot means therefor guiding said arm for movement in the direction of movement of said drive arm, a latching cam on said latching arm, a latching cam follower on said drive arm engageable with said latching cam, and coin controlled means operable upon actuation to restrain movement of said latching arm when in its operating position to latch said drive arm to said drive finger to effect movement of said revoluble member upon rotation of said finger piece.

5. In a coin controlled mechanism, a normally freely rotatable finger piece, operating means controlling an ultimate operation and including a revoluble member coaxial with said finger piece, a plate attached to said revoluble member and normal to the axis thereof, a drive arm pivoted at one end to said plate, a drive cam thereon and extending to the other end thereof, a drive finger connected to and rotatable with said finger piece, a latching arm, pivot means therefor guiding said arm for swinging movement about an axis parallel to the axis of said revoluble member, a latching cam at the free end of said latching arm, a latching cam follower on said drive arm engageable with said latching cam, said drive finger engaging said drive cam and shifting said drive arm and said latching arm outwardly, said drive finger being adapted to pass by said drive cam and beyond said drive arm when said latching arm is free to rotate, and coin controlled means operable upon actuation to restrain movement of said latching arm when in its operating position to latch said drive arm to said drive finger to effect movement of said revoluble member upon rotation of said finger piece.

6. In a coin controlled mechanism, a normally freely rotatable finger piece, operating means controlling an ultimate operation and including a revoluble member coaxial with said finger piece, a plate attached to said revoluble member and normal to the axis thereof, a drive arm pivoted at one end to said plate, a drive cam thereon and extending to the other end thereof, a drive finger connected to and rotatable with said finger piece, a latching arm, pivot means therefor guiding said arm for swinging movement about an axis parallel to the axis of said revoluble member, a latching cam at the free end of said latching arm, a latching cam follower on said drive arm engageable with said latching cam, said drive finger engaging said drive cam and shifting said drive arm and said latching arm outwardly, said drive finger being adapted to pass by said drive cam and beyond said drive arm when said latching arm is free to rotate, coin controlled means operable upon actuation to restrain movement of said latching arm when in its operating position to latch said drive arm to said drive finger to effect movement of said revoluble member upon rotation of said finger piece, and a fixed maintaining cam having a cam surface lying in continuation of the cam surface of said latching cam when the latching arm is in operating position, said maintaining cam maintaining said drive arm latched to said drive finger after said latching cam follower leaves said latching cam.

7. In a coin controlled mechanism for use with two coins, coin receiving means including a plate like member having a first vertical coin receiving passageway, a second vertical coin receiving passageway disposed adjacent said first coin receiving passageway and an inclined discharge passageway communicating with said second vertical passageway, a coin shifter pivoted to said member at a locality intermediate said vertical passageways and having a first finger movable from positions normally blocking the entry of a coin into said second passageway to a position blocking entry of a coin into said first passageway and directing it into the second passageway, and having a second finger disposed in said first passageway at a position below said first finger, said second finger being engageable with a coin entering said first passageway and moving said shifter to shift said first finger into its position blocking entry of a second coin into said first vertical passageway and directing it into said second vertical passageway, movable retaining members in said first and second passageways movable from positions holding a coin in said first passageway at a first working position in engagement with the second finger of said coin shifter and said second coin in a second working position to direct a third coin engaging the same into said discharge passageway and to positions clear of said coins, operating means adapted upon actuation to control an ultimate operation, control means operable upon disposition of two cons at said working positions to actuate said operating means, and said control means moving said retaining members to their free positions to free said coins after actuation of said operating means.

8. In a coin controlled mechanism for use with two coins, coin receiving means including a plate like member having a first vertical coin receiving passageway, a second vertical coin receiving passageway disposed adjacent said first coin receiving passageway and an inclined discharge passageway communicating with said second vertical passageway, a coin shifter pivoted to said member at a locality intermediate said vertical passageways and having a first finger movable from a position normally blocking the entry of a coin into said second passageway to a position blocking entry of a coin into said first passageway and directing it into the second passageway, and having a second finger disposed in said first passageway at a position below said first finger, said second finger being engageable with a coin entering said first passageway and moving said shifter to shift said first finger into its position blocking entry of a second coin into said first vertical passageway and directing it into said second vertical passageway, movable retaining members in said first and second passageways holding a coin in said first passageway at a first working position in engagement with the second finger of said coin shifter and said second coin in a second working position to direct a third coin engaging the same into said discharge passageway, operating means adapted upon actuation to control an ultimate operation, control means operable upon disposition of two coins at said working position to actuate said operating means, a supporting plate, guide means guiding said plate for movement toward and from said planiform member, said retaining members being carried by said supporting plate and moved from retaining positions to positions freeing said coins, a bracket extending outwardly from said plate, a lip formed on said bracket, and said control means having a member engageable with said lip and movable to free said coins after actuation of said operating means.

9. In a coin controlled mechanism for use with two coins, coin receiving means including a plate like member having a first vertical coin receiving passageway, a second vertical coin receiving passageway disposed adjacent said first coin receiving passageway and a discharge passageway communicating with said second vertical passageway, a coin shifter pivoted to said member at a locality intermediate said vertical passageways and having a first finger movable from a position normally blocking the entry of a coin into said second passageway to a position blocking entry of a coin into said first passageway and directing it into the second passageway, and having a second finger disposed in said first pasageway at a position below said first finger, said second finger being engageable with a coin entering said first passageway and moving said shifter to shift said first finger into its position blocking entry of a second coin into said first vertical passageway and directing it into said second vertical passageway, movable retaining members in said first and second passageways holding a coin in said first passageway at a first working position in engagement with the second finger of said coin shifter and said second coin in a second working position to direct a third coin engaging the same into said discharge passageway, operating means adapted upon actuation to control an ultimate operation, control means operable upon disposition of two coins at said working position to actuate said operating means, said control means including feelers guided for movement toward and from said working positions, a sensing arm pivoted for movement toward and from said positions, a sensing lever pivoted intermediate its ends to said sensing arm, each end of said sensing lever being associated with and moving one of said feelers toward its working position, said sensing arm when arrested by both of said coins accommodating actuation of said operating means by said control means.

10. In a coin controlled mechanism for use with two coins, coin receiving means including a plate like member having a first vertical coin receiving passageway, a second vertical coin receiving passageway disposed adjacent said first coin receiving passageway and a discharge passageway communicating with said second vertical passageway, a coin shifter pivoted to said member at a locality intermediate said vertical passageways and having a first finger movable from a position normally blocking the entry of a coin into said second passageway to a position blocking entry of a a coin into said first passageway and directing it into the second passageway, and having a second finger disposed in said first passageway at a position below said first finger, said second finger being engageable with a coin entering said first passageway and moving said shifter to shift said first finger into its position blocking entry of a second coin into said first vertical passageway and directing it into said second vertical passageway, movable retaining members in said first and second passageways holding a coin in said first passageway at a first working position in engagement with the second finger of said coin shifter and said second coin in a second working positon to direct a third coin engaging the same into said discharge passageway, operating means adapted upon actuation to control an ultimate operation, control means operable upon disposition of two coins at said working position to actuate said operating means, said control means including feelers guided for movement toward and from said working positions, a sensing arm pivoted for movement toward and from said positions, a sensing lever pivoted intermediate its ends to said sensing arm, each end of said sensing lever being associated with and moving one of said feelers toward its working position, said sensing arm when arrested by both of said coins accommodating actuation of said operating means by said control means, a bracket movable with said retaining members, a lip formed on said bracket, and said control means having a member engageable with said lip and movable to free said coins after actuation of said operating means.

11. In a coin controlled mechanism for use with two coins, coin receiving means including a core having a first vertical passageway on one side thereof, and a second vertical passageway on the same side thereof spaced from the first passageway, each passageway having a working position, retaining members for retaining coins at said positions, means for directing coins separately to said passageways, said core on the other side thereof having a passageway for another coin, said third passageway having a working position registering with the working position of said second passageway, said core having a hole therein at said second and third working positions, the retaining members for said second position retaining a coin in said third positon, a feeler guided for movement toward and from said first position and engageable with a coin disposed at said position, a feeler guided for movement toward and from said second and third positions and engageable with a coin at either of said positions, a sensing arm, pivoted for movement toward and from said working positions, a sensing lever pivoted intermediate its ends to said sensing arm, each end of said sensing lever being associated with and moving one of said feelers towards its working position, operating means adapted upon actuation to control an ultimate operation, said sensing arm when arrested by both of said coins accommodating actuation of said operating means by said control means.

12. In a coin controlled mechanism for use with two coins, coin receiving means including a core having a first vertical passageway on one side thereof, and a second vertical passageway on the same side thereof spaced from the first passageway, each passageway having a working position, retaining members for retaining coins at said positions, means for directing coins separately to said passageways, said core on the other side thereof having a passageway for another coin, said third passageway having a working position registering with the working position of said second passageway, said core having a hole therein at said second and third working positions, the retaining member for said second position retaining a coin in said third position, a feeler guided for movement toward and from said first position and engageable with a coin disposed at said position, a feeler guided for movement toward and from said second and third positions and engageable with a coin at either of said positions, a sensing arm, pivoted for movement toward and from said working positions, a sensing lever pivoted intermediate its ends to said sensing arm, each end of said sensing lever being associated with and moving one of said feelers toward its working position, a deflector disposed in said second passageway and directing coins headed for said second passageway out of the same, operating means adapted upon actuation to control an ultimate operation, said sensing arm when arrested by two of said coins accommodating actuation of said operating means by said control means.

References Cited in the file of this patent
UNITED STATES PATENTS

| | | |
|---|---|---|
| 1,012,444 | Robbins | Dec. 19, 1911 |
| 2,119,548 | Laughery | June 7, 1938 |
| 2,742,996 | Gersbach et al. | Apr. 24, 1956 |

FOREIGN PATENTS

| | | |
|---|---|---|
| 214,297 | Germany | Nov. 17, 1908 |